United States Patent [19]

Stöger

[11] Patent Number: 5,558,292

[45] Date of Patent: Sep. 24, 1996

[54] MAGNETIC-TAPE CASSETTE HAVING AT LEAST ONE ANTIFRICTION FOIL SEPARATED FROM AN ANTIFRICTION-FOIL STACK

[75] Inventor: Anton Stöger, Vienna, Austria

[73] Assignee: U.S. Philips Corporation, New York, N.Y.

[21] Appl. No.: 335,513

[22] Filed: Nov. 4, 1994

[30] Foreign Application Priority Data

Dec. 24, 1993 [EP] European Pat. Off. ............. 93203682

[51] Int. Cl.$^6$ .................................................. G11B 23/087
[52] U.S. Cl. ................................................ 242/345.3
[58] Field of Search ............................. 242/345, 345.2, 242/343.3

[56] References Cited

U.S. PATENT DOCUMENTS

| | | | |
|---|---|---|---|
| 4,101,096 | 7/1978 | Oishi et al. | 242/345.3 |
| 4,128,216 | 12/1978 | Hioki | 242/345.3 |
| 4,328,936 | 5/1982 | Bordignon | 242/345.3 |
| 4,458,858 | 7/1984 | Nelson | 242/345.3 |
| 4,544,062 | 10/1985 | Maehara | 242/345.2 |
| 4,881,146 | 11/1989 | Bordignon | 242/345.2 |
| 5,377,066 | 12/1994 | Katagiri | 242/345.3 |
| 5,402,296 | 3/1995 | Manzke et al. | 242/345.2 |

FOREIGN PATENT DOCUMENTS

| | | | |
|---|---|---|---|
| WO91/03052 | 3/1991 | WIPO | 242/345.2 |
| WO91/03051 | 3/1991 | WIPO | 242/345.3 |

Primary Examiner—John P. Darling
Attorney, Agent, or Firm—Brian J. Wieghaus

[57] ABSTRACT

Method of manufacturing a magnetic-tape cassette having at least one antifriction foil separated from an antifriction-foil stack, magnetic-tape cassette manufactured by such a method, antifriction-foil stack for use in such a method of manufacturing such a magnetic-tape cassette, and method of manufacturing such an antifriction-foil stack.

In a method of manufacturing a magnetic-tape cassette ($23_1$, $23_2$), in which method an antifriction foil ($8_1$, $8_2$) is inserted into at least one housing section (10) of the housing (11) of the magnetic-tape cassette ($23_1$, $23_2$), which antifriction foil is separated from an antifriction-foil stack (9) and has at least two raised portions ($13_1$, $14_1$, $15_1$, $16_1$; $13_2$, $14_2$, $15_2$, $16_2$, ... $13_{2n}$, $14_{2n}$, $15_{2n}$, $16_{2n}$) which are spaced at a distance ($a_1$, $b_1$, $a_2$, $b_2$) from one another, the antifriction foil ($8_1$, $8_2$, ... $8_{2n}$) is separated from an antifriction-foil stack (9) comprising antifriction foils for which the distances ($a_1$, $b_1$, $a_2$, $b_2$) between the raised portions ($13_1$, $14_1$, $15_1$, $16_1$; $13_2$, $14_2$, $15_2$, $16_2$, ... $13_{2n}$, $14_{2n}$, $15_{2n}$, $16_{2n}$) of two contiguous antifriction foils ($8_1$, $8_2$, $8_3$, $8_4$, ... $8_{2n}$) of the antifriction-foil stack (9) differ in accordance with two different foil variants.

6 Claims, 3 Drawing Sheets

MAGNETIC-TAPE CASSETTE HAVING AT LEAST ONE ANTIFRICTION FOIL SEPARATED FROM AN ANTIFRICTION-FOIL STACK

BACKGROUND OF THE INVENTION

Method of manufacturing a magnetic-tape cassette having at least one antifriction foil separated from an antifriction-foil stack, magnetic-tape cassette manufactured by such a method, antifriction-foil stack for use in such a method of manufacturing such a magnetic-tape cassette, and method of manufacturing such an antifriction-foil stack.

The invention relates to a method of manufacturing a magnetic-tape cassette, in which method an antifriction foil, which is adapted to guide a magnetic tape which can be wound onto at least one reel hub, is inserted into at least one housing section of the housing of the magnetic-tape cassette, which antifriction foil is separated from an antifriction-foil stack comprising a multiplicity of antifriction foils and has at least two raised portions spaced at a distance from one another.

The invention further relates to a magnetic-tape cassette manufactured by a method of the type defined in the opening paragraph, which cassette comprises at least one antifriction foil separated from an antifriction-foil stack comprising a multiplicity of antifriction foils, which antifriction foil has at least two spaced-apart raised portions.

The invention further relates to an antifriction-foil stack for use in a method of the type defined in the opening paragraph for manufacturing a magnetic-tape cassette in accordance with the second paragraph, which stack comprises a multiplicity of antifriction foils, each antifriction foil having at least two spaced-apart raised portions.

The invention further relates to a method of manufacturing an antifriction-foil stack of the type defined in the third paragraph, in which method a multiplicity of antifriction foils having at least two spaced-apart raised portions are manufactured and stacked to form the antifriction-foil stack.

A method of manufacturing a magnetic-tape cassette of the type defined in the opening paragraph is known. In this known method the antifriction foils are separated from an antifriction-foil stack, each antifriction foil having only two rectilinear channel-like or arch-like raised portions and the nominal distances of the two channel-like or arch-like raised portions of the antifriction foils from one another being the same for all the antifriction foils. With the known method this results in all the antifriction foils being closely in contact with one another over their entire surface areas, which may give rise to problems when the antifriction foils are separated to insert them into a magnetic-tape cassette during production of such a cassette, because a so-called glass-plate effect may occur, so that with the known method the undesired situation arises that, instead of only one antifriction foil more than one antifriction foil, is removed from the antifriction-foil stack and inserted into the magnetic-tape cassette. With the known method of manufacturing a magnetic-tape cassette this results in an unserviceable or at least incorrectly or unsatisfactorily functioning magnetic-tape cassette, which is unfavourable and undesirable.

A magnetic-tape cassette of the type defined in the second paragraph is also known. This known magnetic-tape cassette, which comprises two antifriction foils which extend substantially parallel to the cassette main walls to guide the tape edges of the magnetic tape, which extends between two juxtaposed reel hubs, at the location of the tape spool, has only one cassette variant as regards the construction of the antifriction foils because each antifriction foil in this cassette variant has only two rectilinear channel-like or arch-like raised portions and the nominal distances between the two channel-like or arch-like raised portions of the antifriction foils are equal for all the antifriction foils.

An antifriction-foil stack of the type defined in the third paragraph is also known. This known antifriction-foil stack comprises antifriction foils in only one foil variant, each antifriction foil having only two rectilinear channel-like or arch-like raised portions and the nominal distances between the two channel-like or arch-like raised portions of the antifriction foils being equal for all the antifriction foils.

A method of manufacturing an antifriction-foil stack of the type defined in the fourth paragraph is also known. With this known method of manufacturing an antifriction-foil slack only antifriction foils in a single foil variant are stacked in order to form the antifriction-foil stack, only two rectilinear channel-like or arch-like raised portions being provided and the nominal distances between the two channel-like or arch-like raised portions of the antifriction foils being equal for all the antifriction foils in accordance with this single foil variant.

SUMMARY OF THE INVENTION

It is an object of the invention to provide an improved method of manufacturing a magnetic-tape cassette of the type defined in the opening paragraph, which precludes the above-mentioned problems and which ensures a correct separation of the antifriction foils from the antifriction-foil stack during the manufacture of magnetic-tape cassettes. To this end the invention is characterised in that the antifriction foil is separated from an antifriction-foil stack comprising antifriction foils in at least two different foil variants, which foil variants differ from one another as regards the distance between at least two raised portions, the distances between at least two raised portions of two contiguous antifriction foils of the antifriction-foil stack differing in accordance with two different foil variants. In this way it is achieved that, as a result of the differently spaced raised portions of two antifriction foils which are disposed one on top of the other at least the antifriction foils situated at the top of an antifriction-foil stack are not closely in contact over their entire surface areas but owing to the different spacing of the raised portions these raised portions produce a spring effect by which at least the uppermost antifriction foil is slightly lifted off the antifriction foil underneath it, which ensures a correct separation of the uppermost antifriction foil from the antifriction-foil stack and which precludes the incorrect manufacture of a cassette as a result of the erroneous insertion of more than one antifriction foil during the production of a magnetic-tape cassette.

It has proved to be particularly advantageous for the method in accordance with the invention for manufacturing a magnetic-tape cassette if the antifriction foil is separated from an antifriction-foil stack in which the difference of the distances between at least two raised potions of two contiguous antifriction foils of the antifriction-foil stack is in the range from 0.2 mm to 0.6 mm. In practice this has proved to be very favourable because with such a dimensioning only the upper antifriction foils of an antifriction-foil stack are lifted off one another owing to the spring effect between the differently spaced raised portions, but the underlying antifriction foils are almost wholly in contact as a result of the pressure exerted by the antifriction foils situated above them, without the raised portions being deformed. This minimises the overall stack height despite the differently spaced raised portions.

A magnetic-tape cassette in accordance with the invention is characterised in that each antifriction foil has been separated from an antifriction-foil stack comprising antifriction foils in at least two different foil variants, which foil variants differ from one another as regards the distance between at least two raised portions, the distances between at least two raised portions of two contiguous antifriction foils of the antifriction-foil stack differing in accordance with two different foil variants, and the magnetic-tape cassette is constructed in accordance with at least two different cassette variants, including one cassette variant comprising at least one antifriction foil having at least two raised portions spaced by a given distance and another cassette variant comprising at least one antifriction foil having at least two raised portions spaced by another given distance which differs from the first-mentioned given distance. Such a magnetic-tape cassette in accordance with the invention can be manufactured simply by means of a method in accordance with the invention for manufacturing such a magnetic-tape cassette.

For the magnetic-tape cassette in accordance with the invention it has proved to be particularly advantageous if the differences of the distances between at least two raised portions of an antifriction foil of one cassette variant and of an antifriction foil of the other cassette variant is in the range from 0.2 mm to 0.6 mm.

An antifriction-foil stack in accordance with the invention is characterised in that the antifriction-foil stack comprises antifriction foils in at least two different foil variants, which foil variants differ from one another as regards the distances between at least two raised portions, and the distances between at least two raised portions of two contiguous antifriction foils of the antifriction-foil stack differ in accordance with two different foil variants. Such an antifriction-foil stack in accordance with the invention is intended for use in a method in accordance with the invention for manufacturing a magnetic-tape cassette in accordance with the invention.

For the antifriction-foil stack in accordance with the invention it has proved to be particularly advantageous if the difference of the distances between at least two raised portions of two contiguous antifriction foils of the antifriction-foil stack is in the range from 0.2 mm to 0.6 mm.

A method in accordance with the invention for manufacturing an antifriction-foil stack is characterised in that the antifriction-foil stack is manufactured by stacking a multiplicity of antifriction foils in at least two different foil variants, which foil variants differ from one another as regards the distances between at least two raised portions, and the antifriction foils are stacked in such a manner that directly adjoining antifriction foils of the antifriction-foil stack each correspond to a different foil variant. Such a method in accordance with the invention for manufacturing an antifriction-foil stack enables an antifriction-foil stack to be manufactured in a simple manner.

In a method in accordance with the invention for manufacturing an antifriction-foil stack, in which method a number of N foil webs are fed to embossing stations disposed above one another in a stack-like arrangement and are provided with at least two spaced-apart raised potions by embossing operations in the embossing stations, after which the foil webs provided with the raised potions are brought together in a stack-like fashion and are fed to a punching station which punches N antifriction foils from the N foil webs in successive steps, the successively punched-out antifriction foils being subsequently stacked to form an antifriction-foil stack, it has proved to be advantageous if in two directly adjacent embossing stations the directly adjacent foil webs situated therein are each provided with at least two raised portions whose distances from one another differ in accordance with the different foil variants.

In this respect it has proved to be particularly advantageous if in two directly adjacent embossing stations the directly adjacent foil webs situated therein are each provided with at least two raised portions for which the difference between their mutual distances is in the range from 0.2 mm to 0.6 mm.

BRIEF DESCRIPTION OF THE DRAWING

The invention will now be described with reference to two exemplary embodiments which are shown in the drawings but to which the invention is not limited.

Figure 4A:
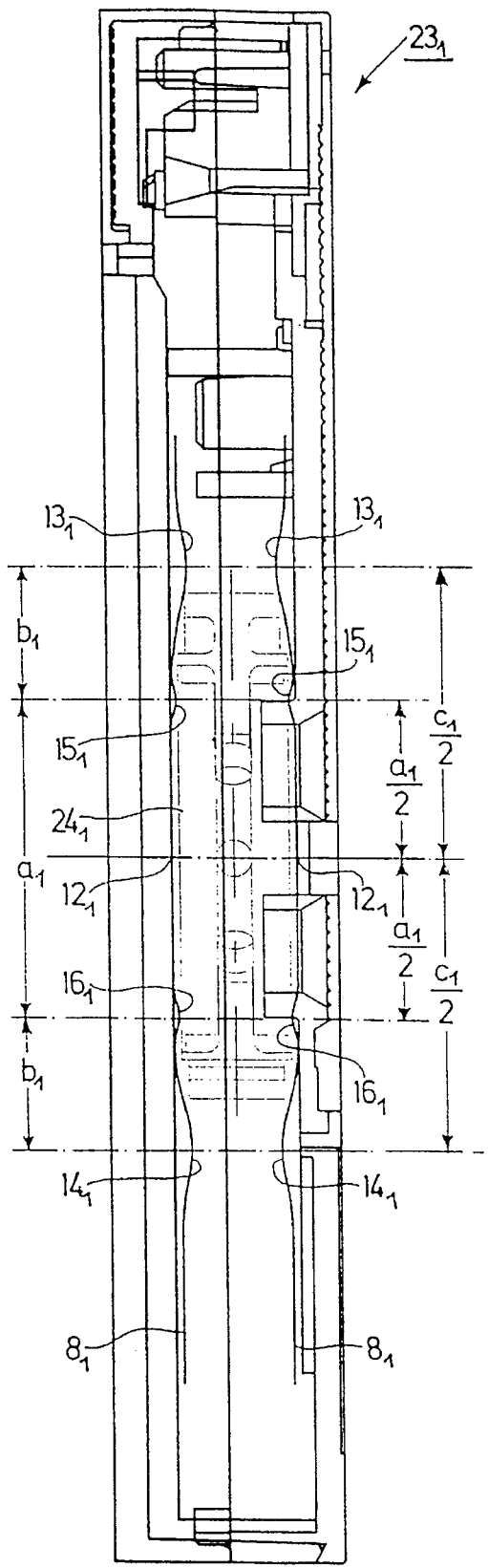
Figure 4B:
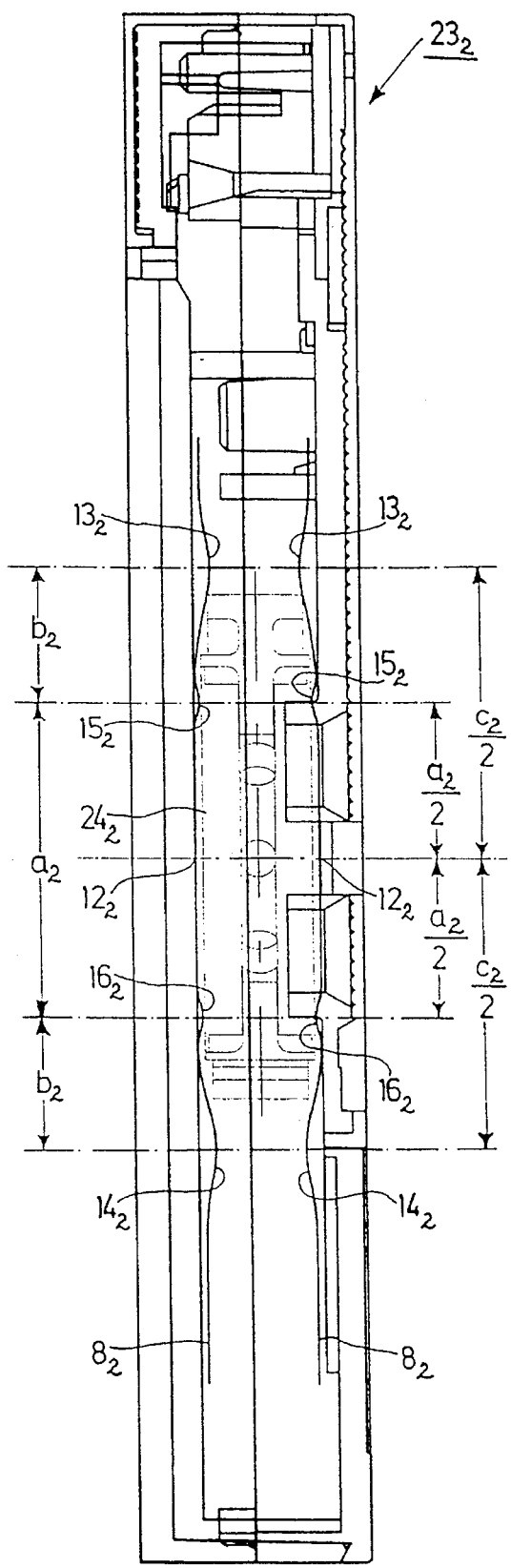

Part A of FIG. 4 shows a tint cassette variant of a magnetic-tape cassette in accordance with the invention and part B shows a second cassette variant of a magnetic-tape cassette in accordance with the invention to a larger than full-size scale, which magnetic-tape cassettes have been manufactured by means of the method in accordance with the invention, described with reference to FIG. 1, for manufacturing magnetic-tape cassettes.

Figure 2:
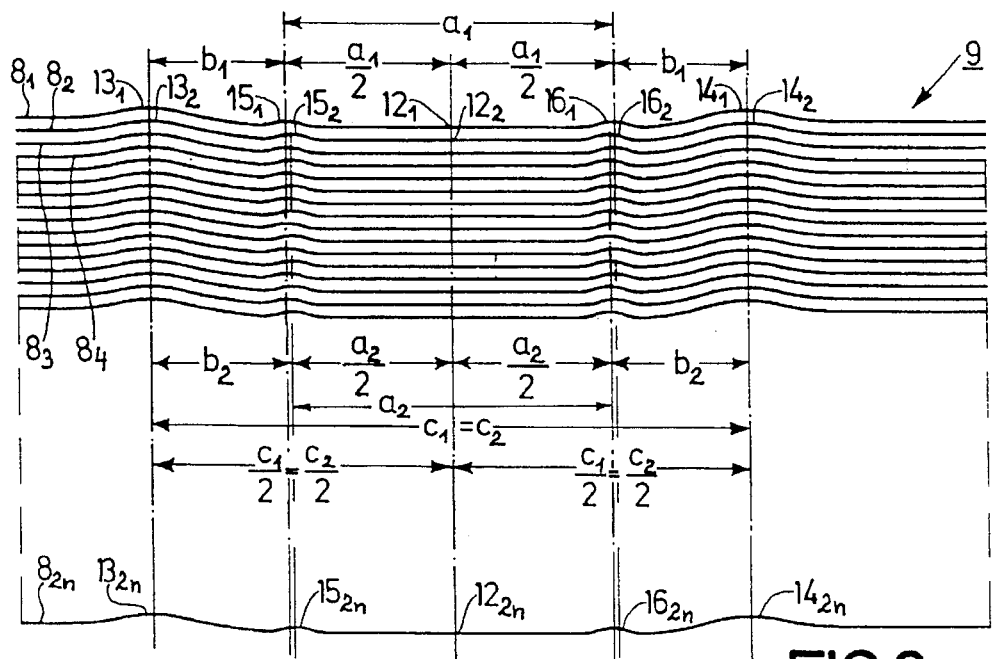
FIG. 2 shows diagrammatically and to a larger scale than FIG. 1 a first variant of an antifriction-foil stack in accordance with the invention for use in the method in accordance with the invention described with reference to FIG. 1.
Figure 5:
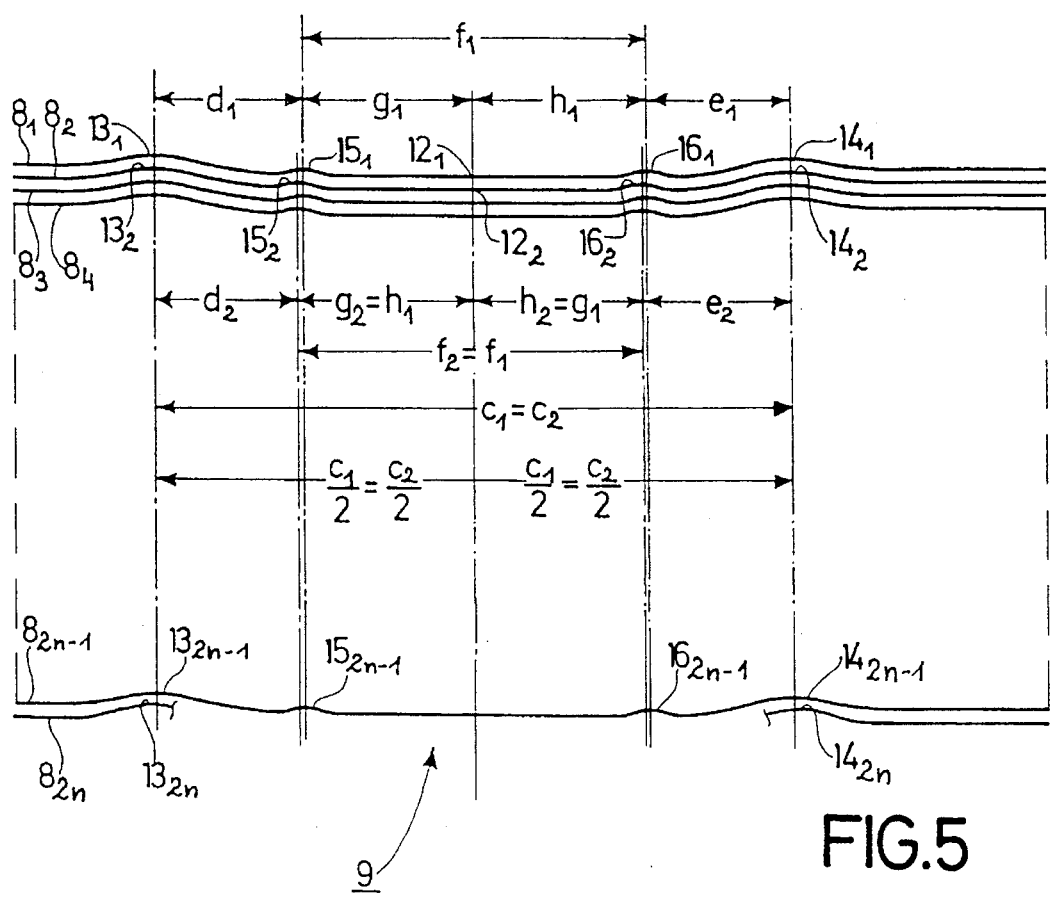

FIG. 5, in the same way as FIG. 2, shows a second variant of an antifriction-foil stack in accordance with the invention.

DESCRIPTION OF THE PREFERRED EMBODIMENTS

Figure 1:
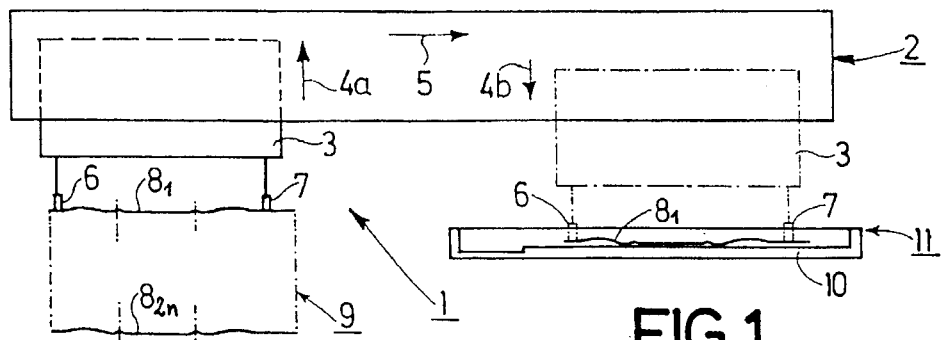
FIG. 1 shows diagrammatically a part of an assembly arrangement by means of which the relevant steps of a method in accordance with the invention for manufacturing a magnetic-tape cassette in accordance with the invention can be carried out, in which method an antifriction foil is separated from an antifriction-foil stack in accordance with the invention and is inserted into a housing half of a magnetic-tape cassette in accordance with the invention.

FIG. 1 shows very diagrammatically a pan of an assembly arrangement 1, which may comprise, for example, a round assembly table. In such an assembly arrangement 1 successive steps of a method for manufacturing a magnetic-tape cassette are carried out in different work stations. Those steps of such a method which are relevant in the present context will be described hereinafter.

The assembly arrangement 1 has a pneumatic work station 2 comprising a slide 3 which is movable between a separating position shown in solid lines in FIG. 1 and an insertion position shown in dash-dot lines in FIG. 1. The slide 3 is moved from its separating position to its insertion position as indicated by the arrows 4a, 5 and 4b in FIG. 1. Four suction pads are connected to the slide 3, two of said pads 6 and 7 being shown in FIG. 1. In the separating position of the slide 3 the suction pads 6 and 7 enable the uppermost antifriction foil 8 to be lifted off, i.e. to be separated from, an antifriction-foil stack 9 consisting of a multiplicity of antifriction foils $8_1$, $8_2$, $8_3$, $8_4$, . . . $8_{2n}$ and shown diagrammatically and to an enlarged scale in FIG. 2. After the slide 3 has been moved to its insertion position the previously separated antifriction foil 8 is inserted into a housing half 10 of the housing 11 of a magnetic-tape cassette, which housing half has first been fed to the work station 2. The antifriction foil 8 serves for guiding a magnetic tape which can be taken up by at least one reel hub of the magnetic-tape cassette, which will be described in detail with reference to FIG. 4. In the method of manufacturing a magnetic-tape cassette, which includes a multiplicity of other steps, which will not be described for the sake of simplicity, and which is carried out by means of the assembly arrangement 1, an antifriction foil 8 is separated from an antifriction-foil stack 9 consisting of a multiplicity of antifriction foils $8_1$, $8_2$, $8_3$, $8_4$, . . . $8_{2n}$ and is inserted into a housing half 10 of the housing 11 of a magnetic-tape cassette.

As is apparent from FIG. 2, each antifriction foil $8_1$, $8_2$, $8_3$, $8_4$, . . . $8_{2n}$ of the antifriction-foil stack 9 has four rectilinear channel-like or arch-like raised portions $13_1$, $14_1$, $15_1$, $16_1$; $13_2$, $14_2$, $15_2$, $16_2$, . . . $13_{2n}$, $14_{2n}$, $15_{2n}$, $16_{2n}$, which extend parallel to a longitudinal axis of symmetry $12_1$, $12_2$, . . . $12_{2n}$. The two raised portions $15_1$ and $16_1$; $15_3$ and $16_3$ etc., and $15_2$ and $16_2$; $15_4$ and $16_4$ etc. are situated at distances $a_1$ and $a_2$, respectively, from one another. The two distances $a_1$ and $a_2$ are not equal. The raised portions $13_1$ and $15_1$; $13_3$ and $15_3$ etc., and $13_2$ and $15_2$; $13_4$ and $15_4$ etc. are situated at distances $b_1$ and $b_2$, respectively, from one another. The two distances $b_1$ and $b_2$ are also unequal. The raised portions $16_1$ and $14_1$; $16_3$ and $14_3$ etc., and $16_2$ and $14_2$; $16_4$ and $14_4$ etc. are also situated at distances $b_1$ and $b_2$, respectively, from one another. As can be seen in FIG. 2, the antifriction-foil stack 9 consequently comprises antifriction foils $8_1$, $8_2$, $8_3$, $8_4$, . . . $8_{2n}$ in two foil variants, which foil variants differ from one another as regards the distances $a_1$, $a_2$, $b_1$, $b_2$ between four raised portions $13_1$, $14_1$, $15_1$, $16_1$, $13_2$, $14_2$, $15_2$, $16_2$, . . . $13_{2n}$, $14_{2n}$, $15_{2n}$, $16_{2n}$, the distances $a_1$, $b_1$, $a_2$, $b_2$ between the raised portions $13_1$, $14_1$, $15_1$, $16_1$; $13_2$, $14_2$, $15_2$, $16_2$ etc. Of two contiguous antifriction foils $8_1$ and $8_2$ etc. of the antifriction-foil stack 9 being different in accordance with the two different foil variants. The upper antifriction foils $8_1$, $8_2$ etc. of the antifriction-foil stack 9 are, for example, practically in point contact with one another only at the location of the differently spaced raised portions $15_1$ and $16_1$ as well as $15_2$ and $16_2$ etc., whilst in the other areas they are slightly spaced apart because the differently spaced raised portions produce a spring effect by which the upper antifriction foils $8_1$, $8_2$ etc. are slightly moved apart. The lower situated antifriction foils of the antifriction-foil stack 9 are almost wholly in contact under the influence of the weight of the antifriction foils situated above them without an undesired deformation of the raised portions. However, for the clarity of the drawing the distance relations in the direction of the stack height are now shown in FIG. 2.

In the method of manufacturing a magnetic-tape cassette as described with reference to FIG. 1 each antifriction foil $8_1$, $8_2$, $8_3$, $8_4$, . . . $8_{2n}$ is separated from an antifriction-foil stack 9 consisting of antifriction foils $8_1$, $8_2$, $8_3$, $8_4$, . . . $8_{2n}$ in two different foil variants, which foil variants differ from one another as regards the distances $a_1$, $b_1$ and $a_2$, $b_2$ of their respective raised portions $13_1$, $14_1$, $15_1$, $16_1$; $13_2$, $14_2$, $15_2$, $16_2$, . . . $13_{2n}$, $14_{2n}$, $15_{2n}$, $16_{2n}$, from one another, the distances $a_1$, $b_1$, $a_2$, $b_2$ between the raised portions $13_1$, $14_1$, $15_1$, $16_1$; $13_2$, $14_2$, $15_2$, $16_2$, . . . $13_{2n}$, $14_{2n}$, $15_{2n}$, $16_{2n}$, respectively, being different in accordance with two different foil variants. The clearance obtained between the upper antifriction foils of the antifriction-foil stack 9 as a result of the spring effect produced by the differently spaced raised portions guarantees that the uppermost foil can always be removed without any problem.

It is to be noted that in the method of manufacturing a magnetic-tape cassette an antifriction foil is also inserted into the second housing half of the housing 11 of the magnetic-tape cassette. During assembly this second housing half together with its antifriction foil is mounted onto the first housing half 10 and the antifriction foil in this second housing half is held in this second housing half, for example, under the influence of a static charge.

In a practical embodiment of an antifriction-foil stack 9 as shown in FIG. 2 the raised portions $15_1$ and $16_1$ as well as $15_3$ and $16_3$ etc. are situated at a distance $a_1$ of 13.2 mm from one another. The raised portions $15_2$ and $16_2$ as well as $15_4$ and $16_4$ etc. are situated at a distance $a_2$ of 12.8 mm from one another. The difference of the distances $a_1$ and $a_2$ between two raised portions $15_1$, $16_1$ and $15_2$, $16_2$ etc. of two contiguous antifriction foils $8_1$ and $8_2$ etc. is therefore 0.4 mm. The distances $b_1$ between the raised portions $13_1$ and $15_1$; $16_1$ and $14_1$ as well as $13_3$ and $15_3$; $16_3$ and $14_3$ etc. of the antifriction foils $8_1$, $8_3$ etc. are the same and have a value of 5.4 mm. The distances $b_2$ between the raised portions $13_2$ and $15_2$; $16_2$ and $14_2$ as well as $13_4$ and $15_4$; $16_4$ and $14_4$ etc. of the antifriction foils $8_2$, $8_4$ etc. are also equal and have a value of 5.6 mm. As a result of these values of the distances $a_1$ and $b_1$, and $a_2$ and $b_2$, respectively, it follows that the distances $c_1$ and $c_2$ between the raised portions $13_1$ and $14_1$, $13_3$ and $14_3$ etc. and $13_2$ and $14_2$, $13_4$ and $14_4$ etc. of the antifriction foils $8_1$, $8_3$ etc. and $8_2$, $8_4$ etc. are equal and have a value of 24.0 mm. It is to be noted that the distances $a_1$ and $a_2$ and, consequently, also the distances $c_1$ and $c_2$ are divided into two equal distance halves $a_1/2$, $a_2/2$, $c_1/2$ and $c_2/2$ by the longitudinal axes of symmetry $12_1$ and $12_2$. The highest point of the raised portions $15_1$, $16_1$, $15_2$, $16_2$ etc. is situated approximately 0.2 mm above the level of the antifriction foils $8_1$, $8_2$ etc. at the location of the longitudinal axes of symmetry $12_1$, $12_2$ etc. The highest point of the raised portions $13_1$, $14_1$, $13_2$, $14_2$ etc. is situated approximately 0.7 mm above the level of the antifriction foils $8_1$, $8_2$ etc. at the location of the longitudinal axes of symmetry $12_1$, $12_2$ etc.

As a result of the offset arrangement of two contiguous antifriction foils of the antifriction-foil stack said raised portions produce a spring effect which causes at least the uppermost foil to be slightly lifted off the foil underneath it, which guarantees that the uppermost antifriction foil is always separated perfectly from the antifriction-foil stack and thus only one antifriction foil is inserted into a housing half of the housing of a magnetic-tape cassette, which substantially precludes the manufacture of a defective cassette by the insertion of more than the desired one antifriction foil.

A method of manufacturing an antifriction-foil stack 9 as shown in FIG. 2 will now be described with reference to FIG. 3. In accordance with this method a multiplicity of antifriction foils $8_1$, $8_2$ etc. each having four raised portions $13_1$, $14_1$, $15_1$, $16_1$ and $13_2$, $14_2$, $15_2$, $16_2$ etc. which are situated at distances $a_1$, $b_1$ and $a_2$, $b_2$, respectively, from one another are manufactured and stacked to form the antifriction-foil stack 9. The antifriction-foil stack 9 is formed by stacking a multiplicity of antifriction foils $8_1$, $8_2$ etc. in two different foil variants, which foil variants differ from one another as regards the distances $a_1$, $b_1$ and $a_2$, $b_2$ between the four respective raised portions $13_1$, $14_1$, $15_1$, $16_1$ and $13_2$, $14_2$, $15_2$, $16_2$ etc., the antifriction foils $8_1$, $8_2$ etc. being stacked in such a manner that directly adjoining antifriction foils $8_1$, $8_2$ etc. of the antifriction-foil stack 9 each correspond to a different foil variant.

Figure 3:
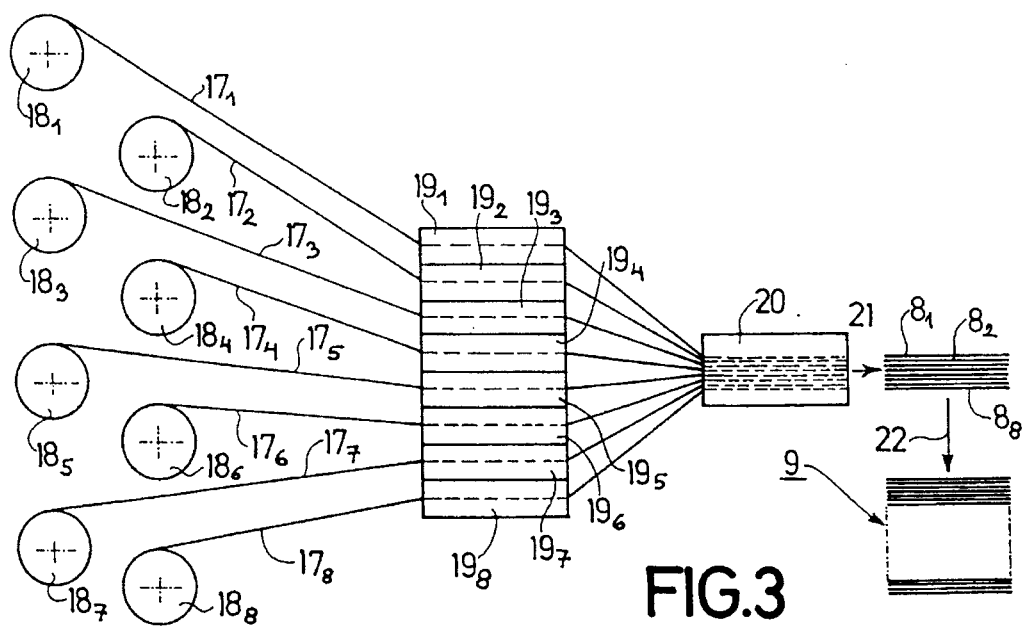
FIG. 3 shows diagrammatically an arrangement for carrying out a method in accordance with the invention for manufacturing the antifriction-foil stack in accordance with the invention shown in FIG. 2.

As is shown diagrammatically in FIG. 3 a number of N foil webs $17_1$, $17_2$, $17_3$, $17_4$, $17_5$, $17_6$, $17_7$ and $17_8$, N being an even integer, i.e. 8, are each fed from a foil-web reel $18_1$, $18_2$, $18_3$, $18_4$, $18_5$, $18_6$, $18_7$ and $18_8$ to embossing stations $19_1$, $19_2$, $19_3$, $19_4$, $19_5$, $19_6$, $19_7$ and $19_8$ disposed above one another in a stack-like arrangement. In the embossing stations $19_1$ to $19_8$ the foil webs are each provided with the four raised portions situated at distances $a_1$, $b_1$ and $a_2$, $b_2$ from one another, the distances $a_1$, $b_1$ and $a_2$, $b_2$ being different in accordance with the two different foil variants. Subsequently, the foil webs $17_1$, $17_2$ to $17_8$ provided with the raised potions $13_1$, $14_1$, $15_1$, $16_1$ and $13_2$, $14_2$, $15_2$, $16_2$ etc. are brought together in a stack-like fashion and fed to a punching station 20. In successive steps the punching station 20 punches N, i.e. 8, antifriction foils from the N, i.e. 8, foil webs $17_1$, $17_2$ to $17_8$. The eight antifriction foils $8_1$, $8_2$ to $8_8$ punched out in successive steps are fed out of the punching station 20 in the direction indicated by an arrow 21 and are finally fed in the direction indicated by an arrow 22 to be stacked onto an antifriction-foil stack 9. Such a method enables an antifriction-foil stack 9 as shown in FIG. 2 to be manufactured in a particularly simple manner because for this purpose it is merely necessary to emboss two adjacent foil webs so as to provide them with differently spaced raised portions.

FIG. 4 shows a magnetic-tape cassette $23_1$, $23_2$ which can be manufactured by means of a method as described with reference to FIG. 1 using an antifriction-foil stack 9 as shown in FIG. 2. Part A of FIG. 4 shows a magnetic-tape cassette $23_1$ in accordance with a first cassette variant and part B shows a magnetic-tape cassette $23_2$ in accordance with a second cassette variant. The first cassette variant $23_1$ comprises two antifriction foils $8_1$ in accordance with a first foil variant having four raised portions $13_1$, $14_1$, $15_1$ and $16_1$, which raised portions are situated at distances $a_1$ and $b_1$ from one another. The second cassette variant $23_1$ shown in part B of FIG. 4 comprises two antifriction foils $8_2$ in accordance with a second foil variant having four raised portions $13_2$, $14_2$, $15_2$ and $16_2$, which raised portions are situated at distances $a_2$ and $b_2$ from one another.

FIG. 4 does not show the magnetic tape, neither for the magnetic-tape cassette $23_1$ in accordance with the first cassette variant nor for the magnetic-tape cassette $23_2$ in accordance with the second cassette variant. However, the Figure does show reel hubs $24_1$ and $24_2$. Each of the magnetic-tape cassettes $23_1$ and $23_2$ has two such reel hubs $24_1$ and $24_2$, which are juxtaposed in the direction of the longitudinal axes of symmetry $12_1$ and $12_2$ of the antifriction foils $8_1$ and $8_2$, respectively, and which are disposed mirror-symmetrically relative to the respective axis $12_1$ or $12_2$. Each of the two reel hubs $24_1$ and $24_2$ cooperates with the channel-like or arch-like raised portions $15_1$, $16_1$ and $15_2$, $16_2$, respectively, of the antifriction foils $8_1$ and $8_2$, respectively, which raised potions extend parallel to the longitudinal axes of symmetry $12_1$ and $12_2$ and ensure an exact axial positioning of the reel hubs $24_1$ and $24_2$. The magnetic tape, not shown in FIG. 4, can be wound onto the reel hubs $24_1$ and $24_2$, the tape edges of the magnetic tape being guided by the two antifriction foils $8_1$ and $8_2$ of the magnetic-tape cassettes $23_1$ and $23_2$, respectively, at the locations of the channel-like or arch-like raised portions $15_1$, $16_1$ and $15_2$, $16_2$, which extend parallel to the longitudinal axes of symmetry $12_1$ and $12_2$, respectively, during winding from one reel hub $24_1$ or $24_2$ to the other reel hub $24_2$ or $24_1$, because these raised portions $13_1$, $14_1$ and $13_2$, $14_2$, respectively, exert a gentle pressure on both tape edges of the magnetic tape.

FIG. 5 shows an antifriction-foil stack 9 in accordance with a second variant. The antifriction foils $8_1$, $8_2$, $8_3$, $8_4$, . . . $8_{2n}$ of the antifriction-foil stack 9 shown in FIG. 5 also have four raised portions $13_1$, $14_1$, $15_1$, $16_1$; $13_2$, $14_2$, $15_2$, $16_2$, . . . $13_{2n}$, $14_{2n}$, $15_{2n}$, $16_{2n}$, respectively. In this antifriction-foil stack 9 the raised portions $15_1$, $15_3$ etc. of the antifriction foils $8_1$, $8_3$ etc. are situated at a distance $g_1$ from the longitudinal axis of symmetry $12_1$, $12_3$ etc. and the raised portions $16_1$, $16_3$ etc. of the antifriction foils $8_1$, $8_3$ etc. are situated at a distance $h_1$ from the longitudinal axis of symmetry $12_1$, $12_3$ etc. The raised portions $15_2$, $15_4$ etc. of the antifriction foils $8_2$, $8_4$ etc. are situated at a distance $g_2 = h_2$ from the longitudinal axis of symmetry $12_2$, $12_4$ etc. The raised portions $16_2$, $16_4$ etc. of have a distance $h_2 = g_1$ from the longitudinal axis of symmetry $12_2$, $12_4$ etc. Consequently, the raised portions $15_1$ and $16_1$, $15_3$ and $16_3$ etc. have a distance $f_1$ and the raised portions $15_2$ and $16_2$, $15_4$ and $16_4$ etc. have a distance $f_2 = f_1$ from one another, which means that the distances between the raised portions $15_1$ and $16_1$, $15_3$ and $16_3$; $15_2$ and $16_2$, $15_4$ and $16_4$ etc. of the antifriction foils $8_1$, $8_2$ to $8_{2n}$ of the antifriction-foil stack 9 shown in FIG. 5 are equal. Nevertheless, the distances $d_1$ and $d_2$ between the raised portions $13_1$ and $15_1$, $13_3$ and $15_3$ etc. and between $13_2$ and $15_2$, $13_4$ and $15_4$ etc. as well as the distances $e_1$ and $e_2$ between the two raised portions $14_1$ and $16_1$, $14_3$ and $16_3$ etc. and $14_2$ and $16_2$, $14_4$ and $16_4$ etc., respectively, differ. The distances $c_1$ and $c_2$ between the raised portions $13_1$ and $14_1$, $13_3$ and $14_3$ etc. and $13_2$ and $14_2$, $13_4$ and $14_4$ etc., respectively, are equal and these two equal distances $c_1$ and $c_2$ are divided into two equal halves $c_1/2$ and $c_2/2$ by the respective longitudinal axes of symmetry $12_1$, $12_3$ etc. and $12_2$, $12_4$ etc.

When an antifriction-foil stack 9 as shown in FIG. 5 is used in a method for manufacturing a magnetic-tape cassette as described with reference to FIG. 1 the offset arrangement of the raised portions $13_1$, $14_1$, $15_1$, and $16_1$; $13_2$, $14_2$, $15_2$ and $16_2$ to $13_{2n}$, $14_{2n}$, $15_{2n}$ and $16_{2n}$ also ensures that these raised portions produce a spring effect which causes at least the uppermost foil to be slightly lifted off the foil underneath it, which guarantees that the uppermost antifriction foil is always separated perfectly from the antifriction-foil stack and thus substantially precludes the manufacture of a defective cassette by the insertion of more than the desired one antifriction foil in a method of manufacturing a magnetic-tape cassette.

The invention is not limited to the two exemplary embodiments described in the foregoing. An antifriction-foil stack may also include three or more foil variants. Likewise, a magnetic-tape cassette may be constructed in accordance with three or more cassette variants. Moreover, a magnetic-tape cassette in accordance with a cassette variant may comprise two different foil variants. Instead of rectilinear channel-like or arch-like raised portions raised portions of other shapes may be used, for example dome-shaped raised portions or channel-like or arch-like raised portions shaped as annular sectors.

I claim:

1. A system of magnetic tape cassettes, comprising:

a first cassette variant and a second cassette variant, said cassette variants including a housing and a tape hub rotatable in said housing onto which a magnetic tape is windable, said housing and tape hub being substantially identical for said first and second cassette variants, and an anti-friction foil having at least two raised portions spaced from each other for one of (i) positioning said tape hub within said housing and (ii) positioning a magnetic tape during winding onto the tape hub relative to said housing, said first cassette variant having a said antifriction foil according to a first variant in which said two raised portions are spaced by a first distance and said second cassette variant having a said antifriction foil according to a second variant in which said two raised portions are separated by a second distance; and said first and second cassette variants are assembled by successively separating the respective first and second anti-friction foils from the top of an antifriction foil stack comprising a plurality of contiguous anti-friction foils, with the antifriction foils of the first type interleaved between those of the second type, the distance between the raised portions of the first and second anti-friction foils being selected such that the antifriction foil on the top of the stack, after removal of each successive anti-friction foil, is slightly lifted relative to the anti-friction foil underneath the top foil by spring action due to the difference in spacing of the at least two raised portions between each successive anti-friction foil.

2. A system of magnetic-tape cassettes as claimed in claim 1, characterised in that the differences of the distances between at least two raised portions of an antifriction foil of one cassette variant and of an antifriction foil of the other cassette variant is in the range from 0.2 mm to 0.6 mm.

3. A system of magnetic tape cassettes according to claim 1, wherein said antifriction foils of each cassette are all of the same variant.

4. A system of magnetic tape cassettes, comprising:

a first cassette variant and a second cassette variant, said cassette variants including a housing, a pair of tape hubs rotatable in said housing, and a magnetic tape attached to each tape hub and transportable between said rotatable hubs within said housing, said housing, tape hub and tape being substantially identical for said first and second cassette variants, and an anti-friction foil having at least two raised portions spaced from each other for one of (i) positioning said tape hub within said housing and (ii) positioning said magnetic tape during winding relative to said housing, said first cassette variant having a said antifriction foil according to a first variant in which said two raised portions are spaced by a first distance and said second cassette variant having a said antifriction foil according to a second variant in which said two raised portions are separated by a second distance; and said first and second cassette variants are assembled by successively separating the respective first and second anti-friction foils from the top of an antifriction foil stack comprising a plurality of contiguous anti-friction foils, with the antifriction foils of the first type interleaved between those of the second type, the distance between the raised portions of the first and second anti-friction foils being selected such that the antifriction foil on the top of the stack, after removal of each successive anti-friction foil, is slightly lifted relative to the anti-friction foil immediately underneath the top foil by spring action due to the difference in spacing of the at least two raised portions between each successive anti-friction foil.

5. A system of magnetic tape cassettes according to claim 4, wherein said antifriction foils of each cassette are all of the same variant.

6. A system of magnetic tape cassettes according to claim 4, wherein the difference in said distances between the at least two raised portions of the first anti-friction foil variant and the second anti-friction foil variant is in the range from 0.2 mm to 0.6 mm.

* * * * *